United States Patent

Fukata

[15] 3,648,174

[45] Mar. 7, 1972

[54] BROADCAST SYSTEM FOR TRANSMITTING A PLURALITY OF CONTROL SIGNALS UNDER PROTECTION AGAINST A FALSE SIGNAL

[72] Inventor: Masayuki Fukata, 94 Shimorenjaku, Mitaka-shi, Tokyo, Japan

[22] Filed: Dec. 4, 1969

[21] Appl. No.: 882,085

[30] Foreign Application Priority Data

Dec. 10, 1968 Japan....................................43/89974

[52] U.S. Cl. ..............................325/64, 179/84 VF, 325/183, 325/187, 340/224, 343/227, 325/55

[51] Int. Cl. ............................................................H04b 3/04

[58] Field of Search ..............................325/55, 64, 183, 187; 179/84 VF; 340/224; 343/228

[56] References Cited

UNITED STATES PATENTS

| | | | |
|---|---|---|---|
| 3,238,503 | 3/1966 | Vitermark et al | 325/55 |
| 3,290,597 | 12/1966 | Denny et al | 325/187 |
| 3,378,817 | 4/1968 | Vitt | 325/55 |
| 3,391,340 | 7/1968 | Flyer et al | 340/224 |
| 3,436,487 | 4/1969 | Blane | 179/84 UF |
| 3,441,858 | 4/1969 | Graham | 325/55 |

*Primary Examiner*—Robert L. Richardson
*Assistant Examiner*—P. M. Pecori
*Attorney*—Robert M. Dunning

[57] ABSTRACT

A broadcast system for transmitting a plurality of control signals to control any kind of switches of devices provided at the receiving side by the use of a control signal formed by at least one signal of a predetermined frequency included in the frequency band of broadcast program signal; in which the control signal comprises a control-start signal common to all control operations to be performed and a plurality of particular control signals predetermined so as to respectively correspond to control operations to be performed and transmitted after the control-start signal. This system has means for eliminating a false signal similar to the control-start signal from the broadcast signal before the devices of the receiving side is erroneously triggered by the false signal to perform reliably desired control operations without disturbance in the transmission medium.

7 Claims, 12 Drawing Figures

INVENTOR.
Masayuki Fukata
BY
Robert M. Dunning
ATTY.

INVENTOR.
Masayuki Fukata
BY
Robert M. Dunning
ATTY.

INVENTOR.
Masayuki Fukata
BY
ATTY.

Patented March 7, 1972 3,648,174

4 Sheets-Sheet 4

INVENTOR
MASAYUKI FUKATA

BY Robert M. Dunning
ATTORNEY

BROADCAST SYSTEM FOR TRANSMITTING A PLURALITY OF CONTROL SIGNALS UNDER PROTECTION AGAINST A FALSE SIGNAL

This invention relates to broadcast systems for control information used to control devices of the receiving side from the sending side and, more particularly, to broadcast systems for control information to control any kind of switches of devices provided at the receiving side.

In these systems, a signal of particular frequency included in the frequency band of the broadcast program is generally used as the control signal. In this case, since signals each difficult to distinguish from the control signal are frequently included in the program signal, the receiving side will run the risk of misdetecting a kind of program signal as a correct control signal. Moreover, if the broadcast signal is broadcast in the air, since the broadcast signal is frequently disturbed by static or manmade noise, a correct control signal may not be detected or the device of receiving side may be mistriggered by a false signal like as the correct control signal. To avoid these mistriggering in the broadcast system of control signal, some methods have been proposed in the art.

In one of the methods, the control signal has a format of complicated redundant code so that the control signal is clearly distinguishable from any of broadcast program signals. In this method, the control signal is formed by a combination of a plurality of signals of different frequencies or by a modulated signal of particular frequency. Moreover, the modulation signal for this modulated signal may be a particular rectangular wave having a particular duration and a particular period.

In another of the methods, the sending side of the broadcast is monitored by a detection means, which is provided for detecting "the state just before the possible spurious triggering of the receiving side caused by a spurious signal like as the control signal" to eliminate like signals succeeding to the false signal detected so as to previously avoid mistriggering (See U.S. Pat. No. 3,566,270).

In another of the methods, a narrow band filter having a sharp cutoff frequency characteristic is used at the receiving side so that noise is effectively eliminated.

As mentioned above, it is necessary in the broadcast system of control information that sufficient protection against mistriggering must be used to transmit reliably the control information from the sending side to the receiving side. While the above relates to the broadcast system performing one kind of control, it will be readily understood that protection technique against mistriggering in a broadcast system for a plurality of control signals becomes more complicated. By way of example, if respective switches of three devices provided at the receiving side are to be On-Off controlled, six kinds of control signals are necessary in total. Accordingly, provision of sufficient protection for each of all the control signals will extremely raise the costs of the sending device and the receiving devices so that this means cannot be adopted. Moreover, since the receiving devices are provided by ordinary customers of the general public, said high price and complication of the receiving device are important defects of the conventional methods in a case of a broadcast system for a plurality of control signals.

An object of this invention is to provide a broadcast system for a plurality of control signals eliminatable of the above-mentioned defects of conventional systems.

Another object of this invention is to provide a broadcast system for a plurality of control signals having sufficient protection function without so raising the price of the device and without so complication of the construction of the device.

Another object of this invention is to provide a broadcast system for a plurality of control signals capable of performing a plurality of controls under the similar order reliability of a single control operation in avoiding said complication of the construction of the device.

In the system of this invention, the control signals for a plurality *n* of different control operations are formed by a single control-start signal commonly used for said different controls and a plurality of particular control signals assigned to respective ones of said different control operations and sent out after the single control-start signal. In this case, the single control-start signal is transmitted under said sufficient protection to switch reliable the receiving devices to respective standby states for said particular control signals. Accordingly, said particular control signals sent out after the single control-start signal are reliably received so as to trigger correctly the devices. In this simple system, the different control operations of the receiving devices are reliably performed from the sending side without disturbance by said false signals or noise. In other words, since the control-start signal is commonly used for all the different control operations and said sufficient protection for mistriggering is adopted for only this single control-start signal, devices of the system can be economically constructed. Moreover, since said particular control signals are transmitted at the standby state of the receiving device switched reliably in response to the control-start signal and at a time where any program signal is not transmitted, detection of said particular control signals is reliably performed without misdetection.

The principle of this invention will be better understood from the following more detailed discussion taken in conjunction with the accompanying drawings, in which the same or equivalent parts are designated by the same reference numerals, characters and symbols, and in which.

Figure 7A:
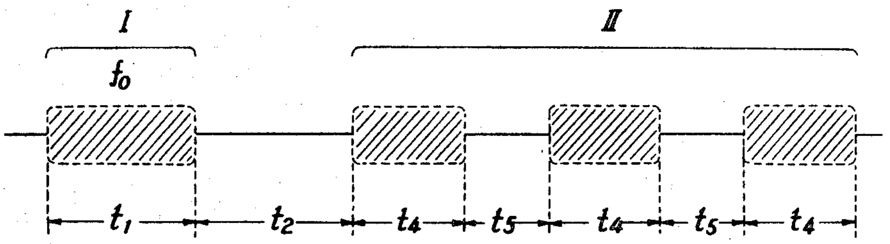
Figure 7B:
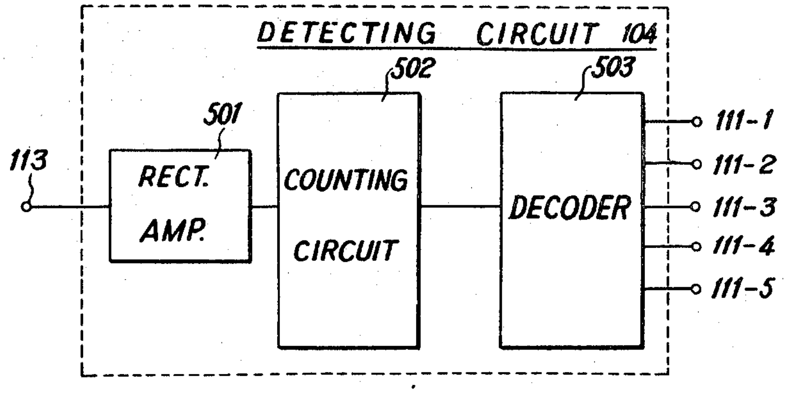
Figure 7C:
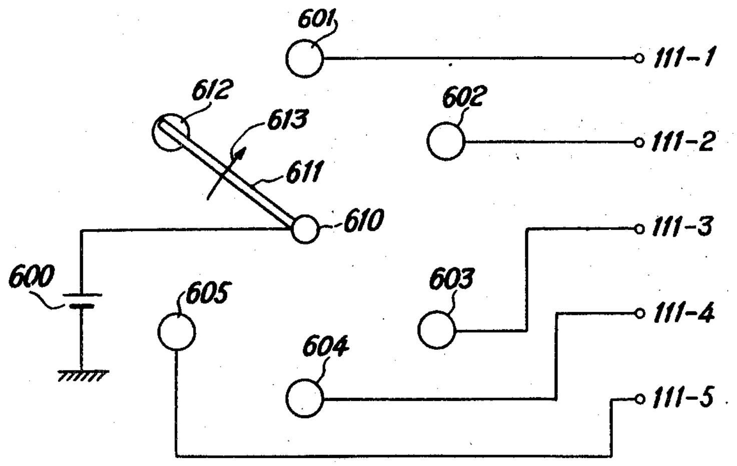

FIG. 7*a* is a time chart explanatory of another example of the format of the control instruction used in the system of this invention;

FIG. 7B is a block diagram illustrating an example of the detecting circuit used in the receiving side of the system of this invention to detect the control instruction shown in FIG. 7A; and FIG. 7C is a connection diagram illustrating an example of means used in the example shown in FIG. 7B.

Figure 8:
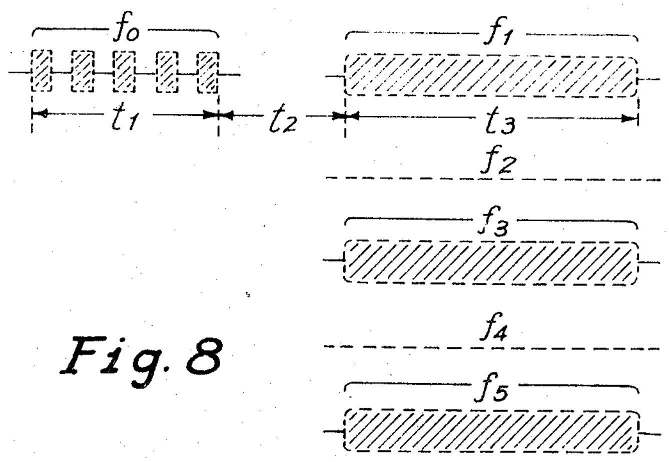
Figure 9:
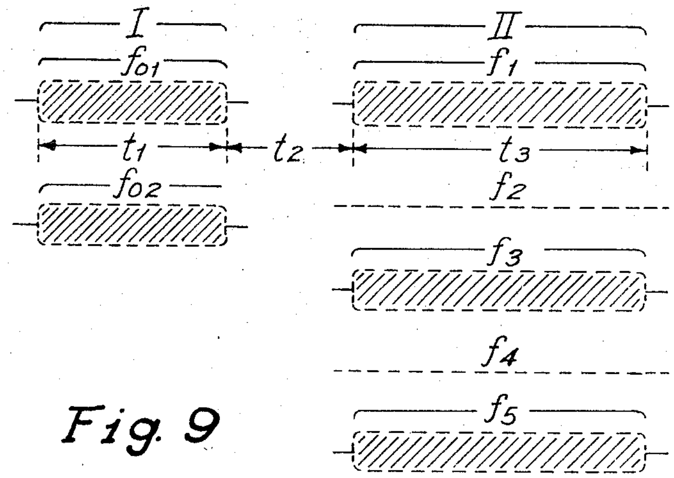
Figure 10:
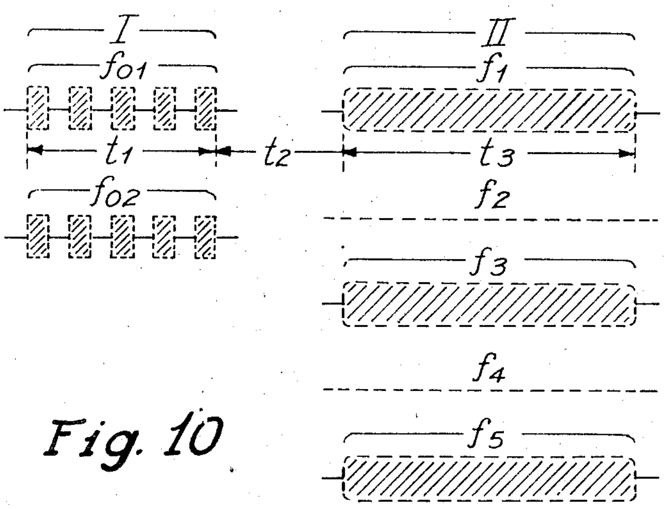

FIG. 8 is a time chart explanatory of a keyed type of format of the control information, FIG. 9 is a time chart explanatory of a plurality of single signals of different frequency type of format of the control information, FIG. 10 is a time chart explanatory of a plurality of keyed signals of different frequency type of format of the control signal.

Figure 1:
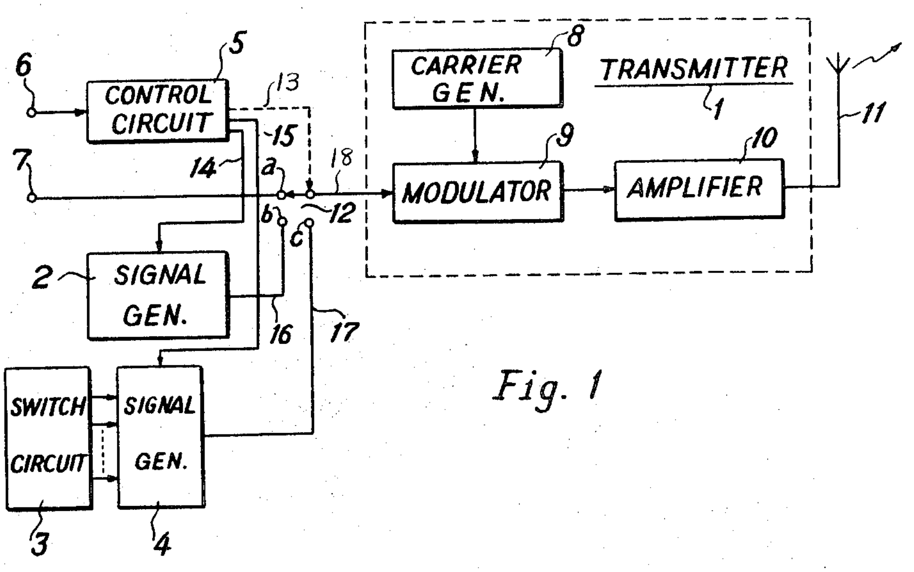
FIG. 1 is a block diagram illustrating an example of the sending side of the system of this invention.

With reference to FIG. 1, an example of the sending side of the system of this invention will first be described. In this example, a transmitter of conventional type for transmitting a modulated wave through an antenna 11 comprises a carrier generator 8, a modulator 9 for modulating a carrier generated from the carrier generator 8 by a modulating signal of a line 18, and selective amplifier 10 for amplifying the modulated signal from the modulator 9 to apply the antenna 11. Program signals to be broadcasted are applied from an input terminal 7, and a control-start instruction is applied from an input terminal 6. A control circuit 5 generates control signals to be applied to lines 14 and 15 in response to the control-start instruction applied from the terminal 6. A signal generator 2 supplies a control-start signal to a line 16 in response to the control signal applied through the line 14. A switch circuit 3 determines the sort of control in accordance with switched pattern of contacts of a plurality of switches. A signal generator 4 generates at least one of particular control signals respectively corresponding to different sorts of control operations. The particular control signals generated from the signal generator 4 are determined by the switched pattern of the switch circuit 3.

The switching contact of a switch 12 (e.g., a relay circuit or a gate circuit) is being switched to a contact $a$ in accordance with the control of the control circuit 5 at the normal condition of the sending side of this system, so that the broadcast program signal applied from the terminal 7 is broadcasted through the transmitter 1 and the antenna 11. If a sort of control is to be performed from this sending side against the receiving side described below, the control-start instruction is applied from the terminal 6 after setting the switched pattern of the switching circuit 3 so as to correspond to the sort of control to be performed. In response to the control-start instruction, the control circuit 5 controls the switch 12 through a line 13 so as to switch to a contact $b$ from the contact $a$ and, at the same time, controls the signal generator 2 so as to generate the control-start signal having a predetermined format. Accordingly, the control-start signal generated from the signal generator 2 is broadcasted through the switch 12, the transmitter 1 and the antenna 11. Thereafter, the control circuit 5 controls the switch 12 through the line 13 so as to switch to a contact $c$ from the contact $b$ and further controls the signal generator 4 through the line 15. In response to this control of the control circuit 5, the signal generator 4 generates the particular control signals corresponding to the selected sort of control to send out them through the switch 12, the transmitter 1 and the antenna 11. The control circuit 5 controls thereafter the switch 12 through the line 13 so as to switch to the contact $a$ from the contact $c$.

Figures 3, 4, 5, 6:
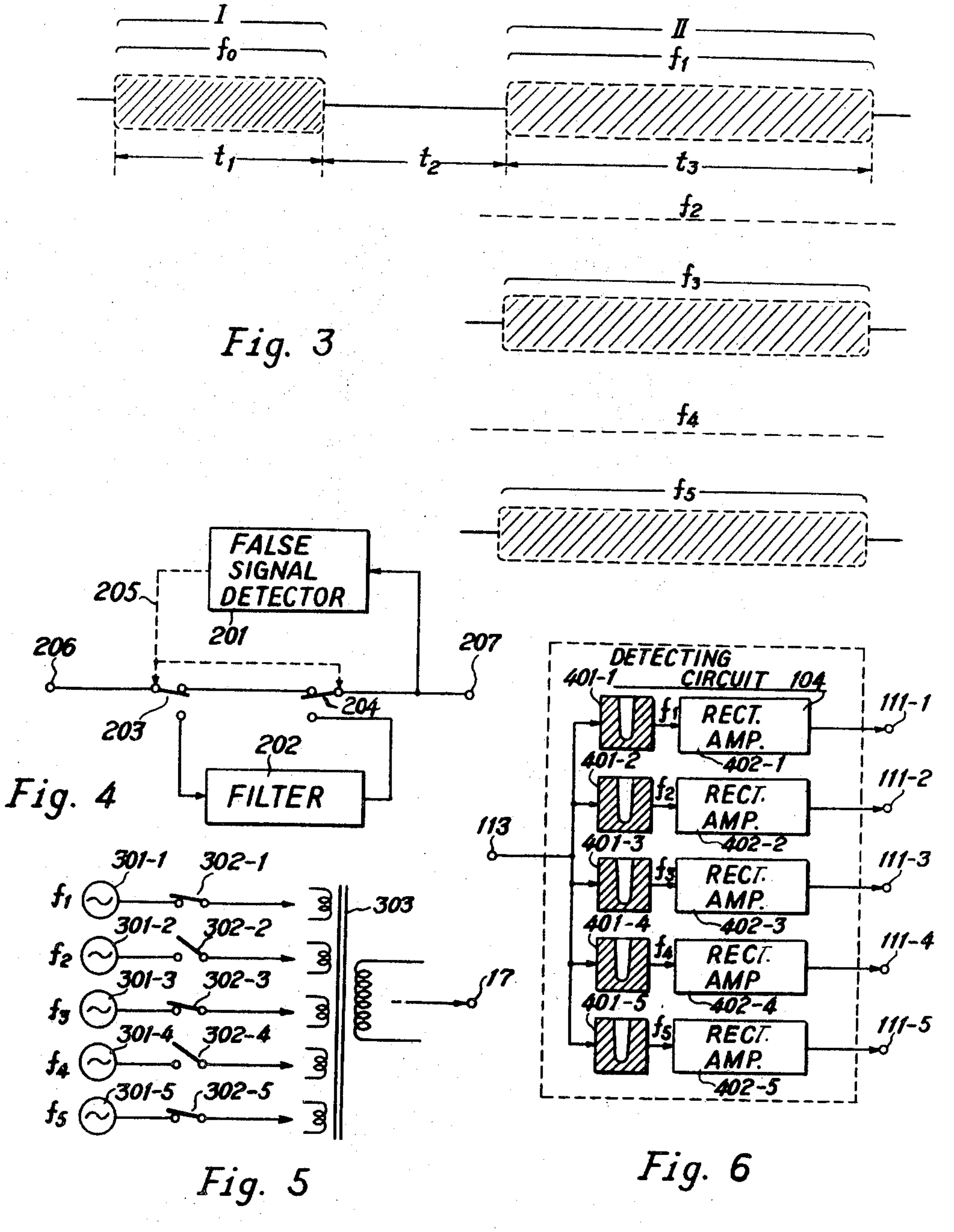
FIG. 3 shows time charts explanatory of an example of a format of control instruction used in the system of this invention.
FIG. 4 is a block diagram illustrating an example of protection means provided at the sending side of the system of this invention.
FIG. 5 is a connection diagram illustrating an example of signal generation means used at the sending side of the system of this invention.
FIG. 6 is a block diagram illustrating an example of a detecting circuit used at the receiving side of the system of this invention.

FIG. 3 shows examples of the control-start signal I and a plurality of particular control signals II. The control-start signal I is a signal of frequency $f_0$ lasting a duration $t_1$. The particular control signals II comprises a plurality of signals having respectively frequencies $f_1$, $f_2$, .... $f_n$ the number of which is determined in consideration of the number of sorts of control operation to be performed. These particular control signals II start after a time $t_2$ starting from the termination of the control-start signal I and lasts at a time $t_3$. In this FIG. 3, examples of particular control signals II are shown in a case where $n$=5 and only signals having frequencies $f_1$, $f_3$, and $f_5$ are generated.

Figure 2:
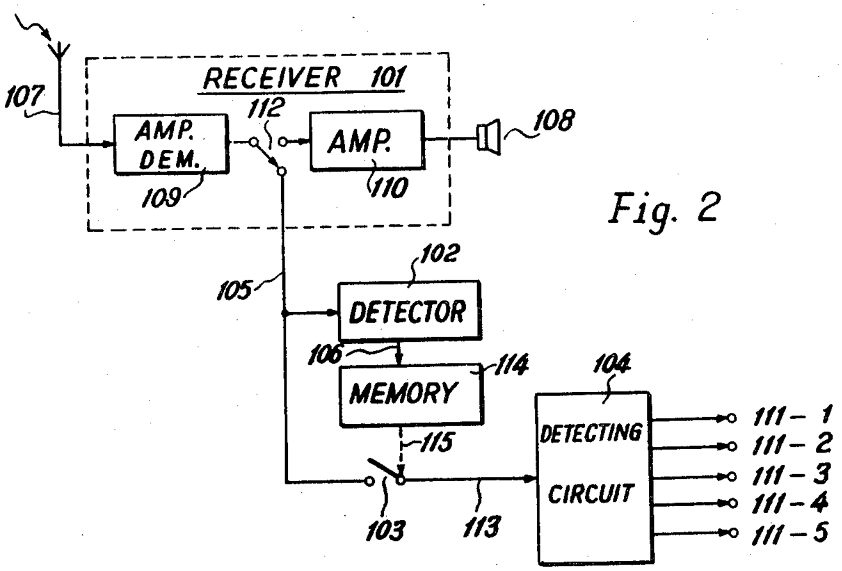
FIG. 2 is a block diagram illustrating an example of the receiving side of the system of this invention.

With reference to FIG. 2, an example of the receiving side of the system of this invention will now be described. In this example, a receiver 101 of conventional type comprises an amplification-demodulation circuit 109 for amplifying a modulated signal received by an antenna 107 by the use of an amplifier (e.g., superheterodyne type) and for demodulating the modulated signal. An audio signal obtained from the amplification-demodulation circuit 109 is applied to an audio amplifier 110 through a switch 112 to excite a speaker 108. A detector 102 detects the control-start signal mentioned above. A memory 114 is a bistable circuit or a monostable circuit by way of example and stores the standby state of the particular control signals mentioned above at a time substantially longer than the duration of the particular control signals. A switch 103 is a relay or a gate, by way of example, controlled by the output of the memory 114 through a line 115. A detecting circuit 104 detects the particular control signals mentioned above and generates outputs to any one or more of output terminals 111-1, 111-2, 111-3, 111-4, and 111-5. The number of these output terminals are determined so as to suit for the number of the sorts of control operations to be performed, but five output terminals are illustrated in FIG. 2 by way of example.

In this example of the receiving side, the switch 112 is switched to a line 105 in the normal condition. Accordingly, if the control-start signal is broadcasted from the sending side mentioned above, this control-start signal is detected by the detector 102 so that the memory 114 is set to the standby state for the particular control signals. Since the switch 103 is switched to the On state in response to the above-mentioned set of the memory 114, the detection circuit 104 is set to the standby state for receiving the particular control signals. Therefore, the particular control signals transmitted after the control-start signals are reliably detected by the detecting circuit 104 so that at least one of output signals is obtained from the output terminals 111-1, 111-2, 111-3, 111-4, and 111-5. In response to any of these outputs (e.g., an output obtained at the terminal 111-1), the switch 112 is switched to the input of the amplifier 110. Accordingly, emergency information or other news program, etc., broadcasted after these control signals can be heard from the speaker 108. The output signals can be employed to control any of other devices, such as the correcting switch of an electromechanically correctable clock, a switch for starting or stopping a tape recoder for receiving and recording news or other broadcast program, On-Off switches of street lamps and On-Off switches of power supplies, etc. In this example, the memory 114 is restored automatically to its initial state after termination of the particular control signals. This circuitry can be constructed by any of conventional circuits, such as delay circuit or other time delay means (not shown).

To raise the reliability of the broadcast system of this invention, it is desirable that the control-start signal is clearly distinguishable from the ordinary broadcast program signal. To meet this requirement, the control-start signal may be formed by the use of a plurality of signals of different frequencies or by a complicated format. In this case, the control signal generator 2 shown in FIG. 1 and the detector 102 shown in FIG. 2 must be designed to suit to the format of the control-start signal.

Another means provided at the sending side to raise the reliability of the broadcast system of this invention is illustrated in FIG 4. This circuitry is provided before the terminal 7 in FIG. 1 so that a terminal 207 is connected to the terminal 7. A false signal detector 201 detects a false signal similar to the correct control signal from the broadcast program signal before the misdetection of the false signal by the detector 102. A filter 202 has a band-elimination characteristic to eliminate the same frequency components as the correct control start signal. Switches 203 and 204 are switched as shown in the normal condition but switched to the filter 202 by the output of the false signal detector 201. Accordingly, the broadcast program signal applied from a terminal 206 are applied to the terminal 7 at the normal condition. However, if a false signal is included in the broadcast program signal, this false signal is detected by the false signal detector 201 before the misdetection by the detector 102 of the receiving side so that the false signal detector 201 generates an output signal to switch the switches 203 and 204 to the filter 202. Accordingly, the same frequency components as the correct control-start signal is effectively eliminated from the broadcast program signal. At the termination of the output of the false signal detector 201, the switches 2–3 and 204 are restored as shown.

With reference to FIG. 5, an example of a combination of the switch circuit 3 and the signal generator 4 for generating particular control signals will be described. In this example, generators 301-1, 301-2, 301-3, 301-4, and 301-5 generate respectively signals of frequencies $f_1$, $f_2$, $f_3$, $f_4$, and $f_5$. Switches 302-1, 302-2, 302-3, 302-4, and 302-5 are switched to the On or Off state in accordance with the sort of control operation to be performed. In this FIG. 5, three switches 302-1, 302-3, and 302-5 are switched to the On state while two switches 302-2 and 302-4 are remained in the Off state. Switched signals (e.g., signals of frequencies $f_1$, $f_3$, and $f_5$ in this example as shown in FIG. 3) are sent out to the line 17 through a hybrid transformer 303 as the particular control signals.

With reference to FIG. 6, an example of the detecting circuit 104 will be described. This detecting circuit 104 comprises narrow band-pass filters 401-1, 401-2, 401-3, 401-4, and 401-5 respectively selecting signals of frequencies $f_1$, $f_2$, $f_3$, $f_4$, and $f_5$. Rectification amplifier 402-1, 402-2, 402-3, 402-4, and 402-5 amplify the respective outputs of the filters 401-1, 401-2, 401-3, 401-4, and 401-5 and rectify the respective outputs amplified to obtain respective output DC signals at the output terminals 111-1, 111-2, 111-3, 111-4, and 111-5. Accordingly, if the particular signals are signals of frequencies $f_1$, $f_3$, and $f_5$ shown in FIG. 3, the output DC signals are obtained at the terminals 111-1, 111-3, and 111-5. By the use of these DC output signals, predetermined control operations can be performed.

The above-mentioned examples of the switch circuit 3, the signal generator 4 and the detecting circuit 104 correspond to means to transmit the particular control signals of continuous format. However, if particular control signals of keying format are employed, keyers (e.g., gate or relay circuits) are respectively inserted between the switches 302-1, 302-2, 302-3, 302-4, and 302-5 and primary windings of the transformer 303, while detectors of keying signals (e.g., counters) are respectively inserted after the rectification amplifiers 402-1, 402-2, 402-3, 402-4, and 402-5. Moreover, a single control operation may be performed by the use of a plurality of particular control signals of continuous type or keyed type. In this case, the output DC signals obtained at the output terminals 111-1, 111-2, 111-3, 111-4, and 111-5 are applied to an AND circuit (not shown) to detect the transmitted single control instruction formed by a combination of a plurality of signals.

With reference to FIGS. 7A, 7B, and 7C, another example of the actual control by the system of this invention will be described. In this example, it is assumed that five sorts of different control operations are to be performed. FIG. 7A shows an example of the control signal to be transmitted, in which the control-start signal I is a continuous signal of frequency $f_0$ lasting a duration $t_1$, and in which the particular control signal II is three keyed signals starting after a time $t_2$ from the termination of the control-start signal I and having each a duration $t_4$ and space times $t_5$. FIG. 7B shows an example of the detecting circuit 104 for detecting the control signal shown in FIG. 7A. In this example, a rectification amplifier 501 amplifies the control signal supplied from the line 113 and converts it to a DC signal. A counting circuit 502 counts the number of pulses of the DC signal converted. A decoder 503 generates an output signal at one of the output terminals 111-1, 111-2, 111-3, 111-4, and 111-5 in accordance with the number of pulses of the particular control signal II. FIG. 7C shows an example of the function performed by the counting circuit 502 and the decoder 503. In this example, a rotation arm 611 is rotated as shown by an arrow 613 in start-stop motion from an initial contact 612 by rotating a rotation shaft 610 by means of an excitation means (not shown) of conventional type, such as a stepping motor. The number of steppings corresponds to the number of pulses of the particular control signal II.

Accordingly, a DC voltage supplied from a DC source 600 is applied to one of output terminals 111-1, 111-2, 111-3, 111-4, and 111-5 through the shaft 610, the rotation arm 611 and one of contacts 601, 602, 603, 604, and 605 so as to correspond to the number of pulses of the transmitted particular control signal II.

As mentioned above, the system of this invention is possible to perform a plurality of sorts of different control operations for devices in the receiving side by transmitting the control-start signal I and the particular control signals II in this order. In this case, the control-start signal I may be a single signal of a predetermined frequency as shown in FIGS. 3 and 7A or a plurality of signals having respective different frequencies as shown in FIGS. 9 and 10. Moreover, this control-start signal may have the format of continuous type as shown in FIGS. 9 and 10 or the format of keyed type as shown in FIGS. 8 and 10. However, the system of this invention has preferably means for eliminating a false signal similar to the correct control-start signal I from the broadcast program signal before the spurious triggering at the device or devices of the receiving side. On the other hand, the particular control signals II may have the keyed format of a single frequency signal as shown in FIG. 7A or may be a plurality of signals of different frequencies respectively corresponding to sorts of control operations to be performed. Moreover, the particular control signals II may be a combination of a plurality of continuous or keyed signals of different frequencies. In any case, since the particular control signals are transmitted after the receiving side is reliably set to the standby state for receiving the particular control signals by the control-start signals transmitted under said sufficient protection, the particular control signals can be detected without error in clearly distinguishing from the broadcast program signal.

What I claim is:

1. A broadcast system for a plurality of control signals in which a plurality of control signals are transmitted by the use of at least one signal of predetermined frequency included in the frequency band of broadcast program signal, the improvement of the system comprising:

a. first generation means for generating a control-start signal common to the control signals in response to control instruction;

b. second generation means for generating at least one of predetermined particular control signals in response to the control instruction said particular control signals corresponding respectively to different control operations to be performed at the receiving side of any of said control signals;

c. selection means for pre-setting the second generation means so as to generate at least one of said predetermined particular control signals in accordance with at least one of said different control operations to be performed;

d. terminal means for applying the broadcast program signal e. switching means coupled to the first and second generation means and the terminal means for selecting any one of the broadcast program signal and respective outputs of the first and second generation means;

f. control means for switching the switching means in response to the control instruction so as to successively selecting the broadcast program signal, the output of the first generation means and the output of the second generation means;

g. a transmitter coupled to the selection means to broadcast the output of the selection means in a transmission medium; and h. elimination means inserted at a position before said switching means in the path of the broadcast program signal said elimination means comprising a false signal detector for detecting a false signal similar to the control-start signal from the broadcast program signal before said receiving side erroneously receives the false signal as the control-start signal, a band-elimination filter having a frequency characteristic eliminatable of a narrow frequency band including frequency components of the control-start signal, and switch means coupled to the output of the false signal detector and the input and output of the band-elimination filter to insert for only a predetermined time the band-elimination filter into the path of the broadcast program signal.

2. A broadcast system for a plurality of control signals according to claim 1, in which the first generation means generates a continuous signal as the control-start signal.

3. A broadcast system for a plurality of control signals according to claim 2, in which the continuous signal is keyed in accordance with a predetermined format.

4. A broadcast system for a plurality of control signals according to claim 1, in which the first generation means generates a combination of a plurality of continuous signals of different frequencies as the control-start signal.

5. A broadcast system for a plurality of control signals according to claim 4, in which a plurality of said continuous signals are keyed in accordance with respectively predetermined formats.

6. A broadcast system for a plurality of control signals according to claim 1, in which the second generation means generates at least one of a plurality of continuous signals of different frequencies as said at least one of predetermined particular control signals, so that the frequencies of the continuous signals correspond to said different operations to be performed.

7. A broadcast system for a plurality of control signals according to claim 1, in which the second generation means generates at least one of a plurality of keyed signals of a single frequency as said at least one of predetermined particular control signals, so that the number of pulses of the keyed signals correspond to said different control operations to be performed.

* * * * *